United States Patent [19]
Iftikar et al.

[11] 4,456,937
[45] Jun. 26, 1984

[54] HEAD POSITIONING ASSEMBLY FOR DISC APPARATUS

[75] Inventors: Syed H. Iftikar, Fremont; David L. Reeck, San Jose, both of Calif.

[73] Assignee: Seagate Technology, Scotts Valley, Calif.

[21] Appl. No.: 263,743

[22] Filed: May 14, 1981

[51] Int. Cl.³ .............................................. G11B 5/55
[52] U.S. Cl. .................................................. 360/106
[58] Field of Search ............... 73/490; 74/89.1-89.22, 74/108; 360/106, 97, 109, 90; 242/117, 118.5; 403/300

[56] References Cited

U.S. PATENT DOCUMENTS

| | | | |
|---|---|---|---|
| 2,404,639 | 7/1946 | Lane | 74/108 |
| 3,167,962 | 2/1965 | Scotto | 73/490 |
| 3,881,189 | 4/1975 | Mayeda | 360/106 |
| 4,161,004 | 7/1979 | Dalziel | 360/106 |
| 4,163,996 | 8/1979 | Kaseta et al. | 360/106 X |
| 4,170,146 | 10/1979 | Owens | 74/89.2 |

FOREIGN PATENT DOCUMENTS 52-62405  5/1977  Japan .................................... 360/90

Primary Examiner—Aristotelis M. Psitos
Assistant Examiner—K. Wong
Attorney, Agent, or Firm—Flehr, Hohbach, Test, Albritton & Herbert

[57] ABSTRACT

A positioning assembly for magnetic heads in a disc apparatus including a band drive. The drive includes a relatively temperature insensitive band drive pulley which is employed to preload the positioning apparatus to minimize backlash runout and the like.

9 Claims, 4 Drawing Figures

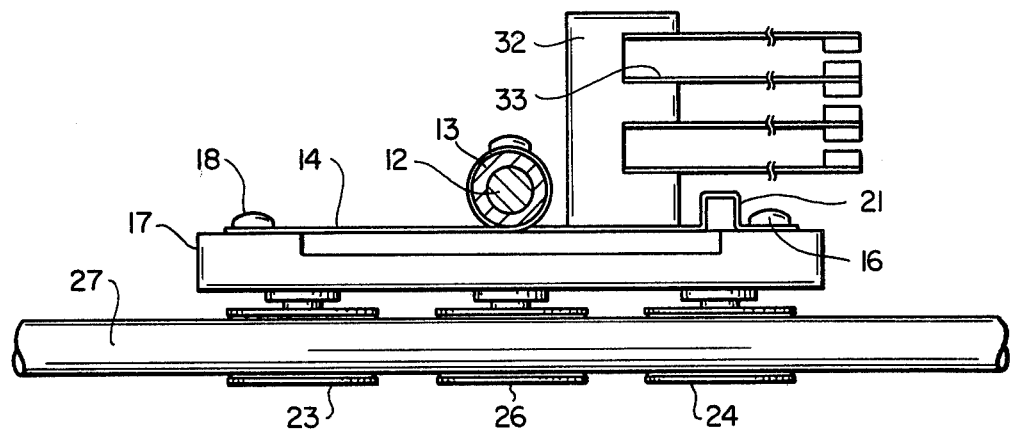
FIG_1
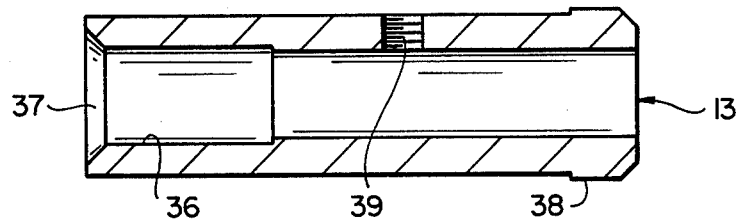
FIG_3
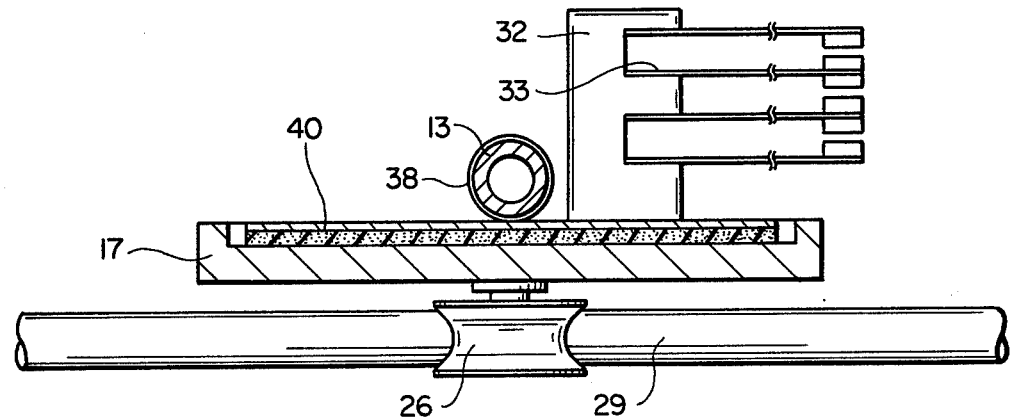
FIG_4

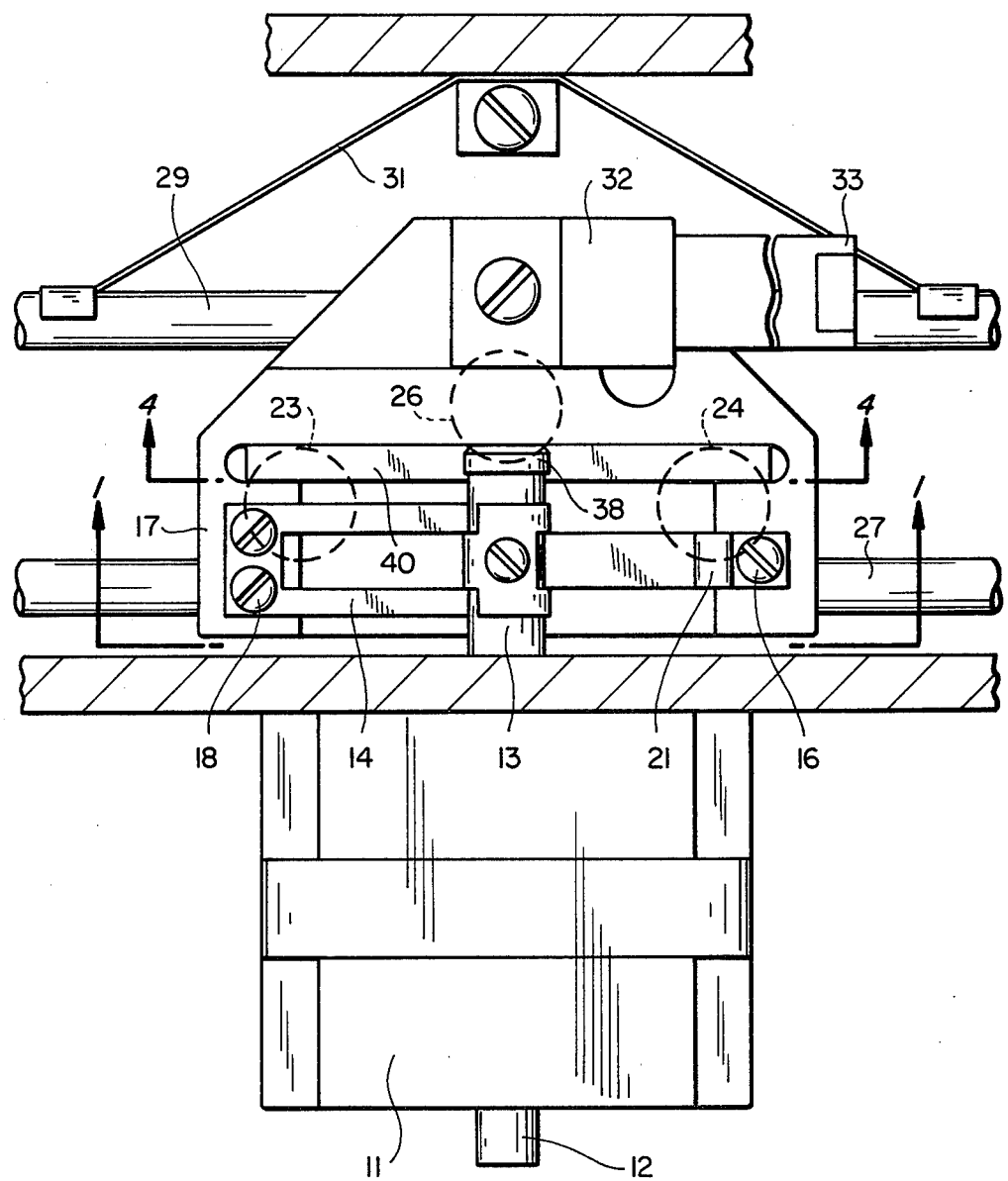
FIG_2

HEAD POSITIONING ASSEMBLY FOR DISC APPARATUS

The invention relates generally to a head positioning assembly for disc drive apparatus and more particularly to a temperature insensitive head positioning assembly.

Disc drive machines record and reproduce information stored on concentric circular tracks recorded on magnetic discs. Tracks are written and read by magnetic heads which cooperate with the surface of the disc. Various methods have been used to position the head including lead screws and band drives. Band drives are shown and described in U.S. Pat. Nos. 3,881,139 and 4,161,004 and 4,170,146 among others. These drives convert rotary motion of a stepper motor shaft to linear motion of a carriage which moves the heads mounted on the carriage radially across the disc to record and read adjacent concentric circular tracks. The drive band is wrapped around the motor shaft or a pulley attached to the shaft and has its ends attached to the carriage whereby rotation of the shaft wraps one end of the band on the pulley while unwrapping the other, causing the carriage to move linearly. Guide means are associated with the carriage to guide the carriage in its linear travel to assure the heads move radially across the associated disc.

A new track is recorded at each step of the stepper motor. The spacing of the tracks is dependent upon the amount of rotation that the motor shaft undergoes with each step and the diameter of the pulley upon which the band is wound.

In the digital magnetic recording field there is a demand for higher and higher storage capability which means that it is desirable to make the spacing between tracks as close as possible and yet to be able to recover the stored information by being able to locate a particular track for retrieval or writing. It has been discovered that changes in ambient temperature, alter the diameter of the shaft or pulley an amount which has a significant effect upon the total travel of the head from the innermost to the outermost track. For example, a low inertia aluminum pulley a quarter inch in diameter will show a difference of over 700 micro inches in total travel for a 70° temperature difference. Although this may appear to be a small difference it has a significant effect upon the packing density, number of tracks, which can be recorded and read without error.

It is the object of the present invention to provide an improved head positioning assembly which is temperature insensitive.

The above and other objects of the invention are achieved by a positioning apparatus including a head carriage, guide means for guiding said carriage, linear drive means driven by a stepper motor including a flexible band having wrapped engagement with a pulley driven by the stepper motor and including end portions secured to the carriage in which said pulley is made of material having a low coefficient of expansion. Preferably the end of the pulley rides on a cushion whereby to minimize runout.

The foregoing and other objects of the invention will be more clearly understood from the following description taken in connection with the drawings of which:

FIG. 1 is a side elevational view of a drive carriage taken along the line 1—1 of FIG. 2;

FIG. 2 is a plan view of a drive carriage and stepper motor incorporating the present invention;

FIG. 3 is an enlarged view of the pulley associated with the stepper motor; and

FIG. 4 is a sectional view taken generally along the lines of 4—4 of FIG. 2.

In copending application Ser. No. 139,428 filed Apr. 11, 1980 entitled HARD FIXED DISC DRIVE ASSEMBLY AND READ-WRITE HEAD ACTUATOR, assigned to a common assignee there is described a disc apparatus in which the present invention is useful and the disclosure of said copending application is incorporated herein by reference.

Referring to FIGS. 1 and 2, the head actuator (useful in said disc drive) is seen to comprise a stepper motor 11 having a drive shaft 12, a hollow pulley 13 is carried at one end of the drive shaft 12 and is adapted to receive a drive band 14. The band includes an inner portion secured by a screw 16 to one end of a carriage 17 and a pair of outer portions secured by a screw 18 to the other end of the carriage. Preferably the drive band includes a U-shaped spring portion 21 to maintain predetermined tension upon the band. The center portion of the band where the center and outer portions merge is suitably secured to the pulley 13. Rotation of the pulley clockwise or counterclockwise winds and unwinds band portions on the pulley to move the carriage.

The carriage includes spaced bearings 23, 24 and 26 disposed in a triangular configuration. Two of the bearings 23 and 24 are adapted to ride along a fixed way or track 27 while the other bearing 26 is adapted to ride along a floating track 29. The track 29 is supported by a spring 31 or other resilient means whereby to urge the track 29 against the bearing 26 to maintain the bearings 23 and 24 in intimate contact with the fixed trackway. This provides a self-aligning no backlash arrangement with minimum wear and increased bearing life, the carriage guide is described in more detail in my copending application Ser. No. 139,428, filed Apr. 11, 1980.

The carriage 17 is relatively light and serves to mount an E-shaped or other suitable mount 32 for a plurality of magnetic heads 33 which are adapted to cooperate with one or more discs associated therewith. By controlling the stepper motor 11 the carriage moves linearly along the track 27 to move the heads radially in and out along the surface of the associated disc to read and write information on the disc surface.

Turning now more particularly to FIG. 3, the hollow pulley is of cylindrical configuration. The pulley includes a bore having a portion 36 of a first diameter adapted to receive and tightly fit upon the motor shaft 12. The end portion includes an inclined surface 37 which is adapted to guide and allow the pulley to be forced upon the shaft. The other end of the pulley has an enlarged head portion 38 which is adapted to ride upon the surface cushion pad 40, FIG. 4, along a line generally at the center of the bearings to preload the bearings and to support the pulley end. This engagement also serves to minimize runout caused drag because the resilient member accommodates differences in diameter due to temperature changes. The pulley includes a threaded hole 39 for receiving a screw which secures the center of the band. The enlarged end portion also protects the band from being pinched between the pulley and carriage and protects the band against scratches, nicks and other defects which may be caused by particles. The hollow pulley is low inertia.

In accordance with the present invention the pulley is selected from a material having a relatively low coefficient of thermal expansion. We have found a zirconium pulley to be satisfactory although the pulley may be selected from other materials having low coefficients of expansion such as carbon, chromium, hafnium molybdenum, osmium, platinum, tantalum, titanium, tungsten and zirconium. These and other metals having a low coefficient of expansion are suitable for use as a pulley. For example, in using zirconium in comparison to aluminum and assuming a quarter inch shaft with 70° temperature rise the stroke changes by over 700 microinches for the aluminum whereas it changes slightly over 180 microinches for zirconium. This vast difference permits closer track spacing and improved tracking.

Thus, there has been provided a positioning assembly for disc drive machines having a capability of higher track densities and improved operation.

What is claimed is:

1. In positioning apparatus for positioning magnetic heads relative to a recording medium including a carriage adapted to mount said magnetic heads; carriage guide means for linearly guiding said carriage to position said heads relative to said recording medium; linear drive means including a drive motor, a pulley driven by said drive motor and a flexible band means having wrapped engagement with the pulley and end portions attached to said carriage whereby rotation of the pulley imparts linear movement to said carriage, the improvement comprising a hollow pulley made of material having a low coefficient of thermal expansion.

2. A positioning apparatus as in claim 1 in which said carriage guide means includes a pair of spaced tracks and space bearings adapted to ride on said tracks to provide support for the carriage, an elongated member mounted on the carriage, said pulley including an enlarged portion positioned to engage the resilient member to provide a uniform load to the bearings and to protect the band against wear.

3. A positioning apparatus as in claim 2 wherein said resilient member is mounted between said tracks to provide said uniform load.

4. A positioning apparatus as claimed in claim 2 wherein said drive motor comprises a motor shaft, said hollow pulley having a bore extending the length of said pulley, said drive shaft being inserted into a first portion of the bore of said hollow pulley, said flexible band being wrapped about a second portion of said hollow pulley into which said motor drive shaft is now inserted, whereby the effective radius of said pulley is not affected by the thermal expansion of said drive motor.

5. A positioning apparatus as claimed in claim 2 wherein the material of said hollow pulley has a coefficient of thermal expansion which is low relative to aluminum.

6. A positioning apparatus for positioning magnetic heads relative to a recording medium including a carriage carrier on bearings adapted to mount said magnetic heads; carriage guide means for guiding said carriage to position said head relative to said recording medium; linear drive means including a drive motor, a pulley driven by said drive motor and a flexible band means having wrapped engagement with the pulley and end portions attached to said carriage whereby rotation of the pulley imparts linear movement to said carriage, the improvement comprising said pulley having an enlarged portion positioned to engage a resilient member mounted on said carriage to provide a uniform load to the bearings and to protect said band against wear.

7. A positioning apparatus as claimed in claim 6 wherein said pulley is hollow.

8. A positioning apparatus as claimed in claim 7 wherein the material of said hollow pulley has a coefficient of thermal expansion which is low relative to aluminum.

9. A positioning apparatus as claimed in claim 8 wherein said drive motor comprises a motor shaft, said hollow pulley having a bore extending the length of said pulley, said drive shaft being inserted into a first portion of the bore of said hollow pulley, said flexible band being wrapped about a second portion of said hollow pulley into which said motor drive shaft is now inserted, whereby the effective radius of said pulley is not affected by the thermal expansion of said drive motor.

* * * * *